United States Patent
Nitsche et al.

(10) Patent No.: US 11,362,877 B2
(45) Date of Patent: Jun. 14, 2022

(54) FAST SCAN OF NB-IOT SIGNALS IN NETWORKS

(71) Applicant: COMMSOLID GMBH, Dresden (DE)

(72) Inventors: Gunnar Nitsche, Radebeul (DE); Michael Schmidt, Dresden (DE)

(73) Assignee: COMMSOLID GMBH, Dresden (DE)

( * ) Notice: Subject to any disclaimer, the term of this patent is extended or adjusted under 35 U.S.C. 154(b) by 406 days.

(21) Appl. No.: 16/476,667

(22) PCT Filed: Jul. 16, 2018

(86) PCT No.: PCT/EP2018/069274
§ 371 (c)(1),
(2) Date: Jul. 9, 2019

(87) PCT Pub. No.: WO2020/015811
PCT Pub. Date: Jan. 23, 2020

(65) Prior Publication Data
US 2021/0409253 A1    Dec. 30, 2021

(51) Int. Cl.
*H04L 5/12* (2006.01)
*H04L 27/26* (2006.01)

(52) U.S. Cl.
CPC ...... *H04L 27/2666* (2013.01); *H04L 27/2657* (2013.01); *H04L 27/2676* (2013.01); *H04L 27/2685* (2013.01); *H04L 27/2675* (2013.01)

(58) Field of Classification Search
CPC ............ H04L 27/2666; H04L 27/2657; H04L 27/2676; H04L 27/2685; H04L 27/2675
USPC ....................................................... 375/262
See application file for complete search history.

(56) References Cited

U.S. PATENT DOCUMENTS

| | | | |
|---|---|---|---|
| 2017/0026205 A1* | 1/2017 | Agee ................. | H04W 28/14 |
| 2017/0366311 A1* | 12/2017 | Iyer ...................... | H04B 7/0482 |
| 2019/0052442 A1* | 2/2019 | Kim ................... | H04W 72/048 |
| 2020/0359323 A1* | 11/2020 | Beale ................. | H04J 13/0062 |

FOREIGN PATENT DOCUMENTS

| | | |
|---|---|---|
| EP | 3261307 A1 | 12/2017 |
| EP | 3352490 A1 | 7/2018 |

OTHER PUBLICATIONS

International Search Report and Written Opinion issued in PCT/EP2018/069274 dated Oct. 26, 2018.

(Continued)

*Primary Examiner* — Don N Vo
(74) *Attorney, Agent, or Firm* — Heslin Rothenberg Farley and Mesiti PC; Nicholas Mesiti

(57) ABSTRACT

The invention discloses a method for fast detection scan of NB-IoT signals in networks. The object of the invention to provide a scanning procedure which is reliable and very fast in order to reduce the search time and hence the power consumption will be solved by a method for fast detection scan of NB-IoT signals in a network by applying a higher sampling rate than 240 kHz and observing a received signal at a receive bandwidth around a magnitude wider than the NB-IoT signal bandwidth of 180 kHz, wherein a set of 2M+1 NB-IoT signals each having a different E-UTRA absolute radio frequency channel number (EARFCN) can be observed simultaneously, whereas M is a natural number and 2M+1 indicates the number of concurrently observed channels.

11 Claims, 2 Drawing Sheets

(56) References Cited

OTHER PUBLICATIONS

Figure 1:
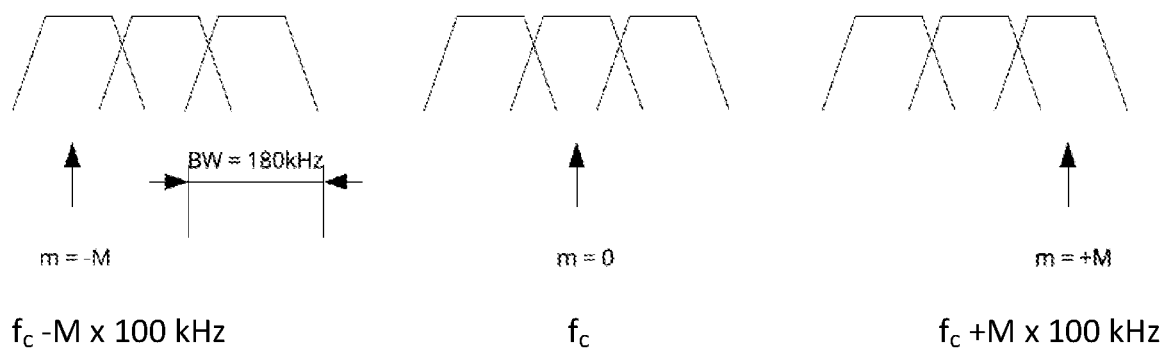

Intel Corporation, "On device complexity for NB-IoT" 3GPP Draft; R1-156524, Nov. 15, 2015, Retrieved from Internet: http://www.3gpp.org/ftp/Meetings_3GPP_SYNC/RAN1/Docs/.
Qualcomm Incorporated, "NB-PSS and NB-SSS Design (Revised)" 3GPP Draft; R1-161981, Mar. 22, 2016, Retrieved from Internet: http://www.3gpp.org/ftp/tsg_ran/WG1_RL1/TSGR1_AH/LTE_NB-IoT_1603/Docs/.
Keysight Technologies, "Discussion on NB-IoT Testing frequencies definition" 3GPP Draft R5-165749, Aug. 22, 2016.
Huawei et al., "Discussion on cell search for NB-IoT" 3GPP Draft R4-166042, Aug. 22, 2016.
Huawei et al., "NB-PSS evaluation" 3GPP Draft R1-161994, Mar. 22, 2016.
Ericsson, "Cell detection times in NB-IoT", 3GPP Draft R4-164150, May 23, 2016.

* cited by examiner

FAST SCAN OF NB-IOT SIGNALS IN NETWORKS

CROSS REFERENCE TO RELATED APPLICATIONS

This application is the National Phase filing under 35 U.S.C. § 371 of International Application No.: PCT/EP2018/069274, filed on Jul. 16, 2018. The contents of the prior application is hereby incorporated by reference herein in its entirety.

The invention discloses a method for fast detection scan of NB-IoT signals in networks.

BACKGROUND ART

It is important for all wireless standards to be able to quickly detect available networks. Each standard requires different methods adapted to the particular standard. In EP 3043602 A1 a fast method suitable for the 3GPP standard LTE is described. As the new 3GPP standard NB-IoT (narrowband internet of things) is based on completely new synchronization signals, other methods are required for this new standard. A straightforward but slow implementation for NB-IoT is given in the contribution R1-161981 NB-PSS and NB-SSS Design.doc; http://www.3gpp.orgq/ftp/TS-G_RAN/WG1_RL1/TSGR1_AH/LTE_NB-IoT_1603/Docs/R1-161981.zip.

NB-IoT is a complete new LTE based communication standard of 3GPP release 13, targeting cellular based IoT communication with low power consumption, low device costs and extended range of the radio link. For internet of things applications, the low power consumption is very important, in particular for battery powered devices. As reduction of search time of mobile radio communication networks also reduces power consumption, fast scan is even more important for IoT compared to other wireless applications. Furthermore, as NB-IoT shall work in extreme coverage situations, state-of-the-art algorithms are especially slow here. The coverage of a network, e.g. the NB-IoT network, is the geographic area where the station of a network can communicate. Coverage depends on several factors, such as orography and buildings, technology, radio frequency as well as the sensitivity and transmit efficiency of the consumer equipment. Scanning on a single carrier frequency may take several seconds, scanning a whole frequency band may take several minutes.

Similar to the baseline LTE standard, an initial scan procedure is required during PLMN (public land mobile network) selection in order to find the unknown EARFCN (E-UTRA absolute radio frequency channel number). E-UTRA is the air interface of 3rd Generation Partnership Project (3GPP) Long Term Evolution (LTE) upgrade path for mobile networks. With regard to average low power consumption, the active time (also called on-time) of the radio part should be as short as possible. In particular, the low noise amplifier (LNA) and the frequency synthesis of the radio part are the main contributor to the overall power consumption, while being in receive mode. As a matter of fact, it is very beneficial to have a means for a fast frequency scan.

A fast scan of NB-IoT signals over a wide frequency range cannot be simply based on energy detection, since the time domain signal of a LTE frame is subject to gaps of silence. Also, the NB-IoT downlink receive procedure (MIB-Master Information Block, SIB-1—System Information Block-1) requires a relative long on-time of the radio.

It is therefore desirable to start the complete receive procedure only, if there is a high confidence that the detected signal is most likely a NB-IoT signal.

Similar to LTE, dedicated synchronization sequences are specified in 3GPP, called NPSS (Narrowband Primary Synchronization Signal) and NSSS (Narrowband Secondary Synchronization Signal). For a reliable frequency scan it is therefore useful to exploit the specific properties of those synchronization sequences.

The frequency domain sequence used for the narrowband primary synchronization signal (NPSS) is generated from a frequency-domain Zadoff-Chu sequence according to $$d_{l+3}(n) = S(l)e^{-j\frac{\pi 5 n(n+1)}{11}}, n = 0, 1, \ldots, 10; l = 0, 1, \ldots, 10 \text{ with a cover code} \quad \text{(Eq. 1)}$$

$$\{S(l)\}_{l=0}^{10} = \{+1, +1, +1, +1, -1, -1, +1, +1, +1, -1, +1\}$$

The NPSS sequence is repeated eleven times, where the sign of each repetition is determined by the cover code. In R1-161981 NB-PSS and NB-SSS Design.doc (see above), a time domain algorithm has been proposed, exploiting the auto-correlation properties of the Zadoff-Chu sequence in conjunction with the cover code. Therein a NPSS signal detection at a low sampling rate fs≤240 kHz is proposed. This is appropriate with regard to the bandwidth BW of the NB-IoT signal (BW≈180 kHz), provided the EARFCN is already known. However, if the EARFCN has not been identified yet, the NPSS signal detection must be serially re-invoked for each EARFCN within the frequency band of interest.

It is therefore the object of the invention to provide a scanning procedure which is reliable and very fast in order to reduce the search time and hence the power consumption.

SUMMARY OF THE INVENTION

The object of the invention will be solved by a method for fast detection scan of NB-IoT signals in a network by applying a higher sampling rate than 240 kHz and observing a received signal at a receive bandwidth around a magnitude wider than the NB-IoT signal bandwidth of 180 kHz, wherein a set of 2M+1 NB-IoT signals each having a different E-UTRA absolute radio frequency channel number (EARFCN) can be observed simultaneously, whereas M is a natural number and 2M+1 indicates the number of concurrently observed channels.

NB-IoT cells may occur on carrier frequencies on a 100 kHz grid. Normally, state-of-the-art algorithms scan every 100 kHz step using a bandwidth of 200 kHz, thus require e.g. 600 scans on the 3GPP band 20. The 3 GPP band 20 stands for the frequency band of the digital dividend, which offered in Germany mainly by LTE as a DSL alternative. A frequency range of 791-821 MHz is available for download—ergo 30 MHz. For example, the specification of 3GPP band 20 provides that frequency bands of 5, 10, 15 or 20 MHz bandwidth can be used for operation. In order to perform the search for NB-IoT signals faster the inventive method uses a wider bandwidth, e.g. 1.1 MHz, as well as a fast Fourier transformation to transform time domain samples into frequency domain samples and uses special auto-correlations in the frequency domain to detect (e.g. 11) carrier frequency candidates which could carry the NB-IoT signals simultaneously.

The advantages of the inventive method can be seen in the much higher network scan speed, approximately 10 times higher, that also leads to much less power consumption and the trade-off between scan speed and sensitivity can easily be configured at runtime.

This means, applying a higher sampling rate fs and thus observing the signal at a higher receive bandwidth relative to the signal bandwidth BW gives rise to a parallel search of multiple EARFCN in a single run of NPSS search. A frequency interval $$-\frac{BW}{2} - M\Delta \leq f \leq M\Delta + \frac{BW}{2}, \Delta = 100 \text{ kHz} \quad \text{(Eq. 2)}$$

supports a simultaneous scan of EARFCN $-M \leq m \leq -1$ and $1 \leq m \leq M$ in addition to the EARFCN for m=0 relative to the carrier frequency fc, see FIG. 1. The integer value m stands for the EARFCN offset.

In principle, this can be accomplished, applying a bank of local discrete time mixers, each with a frequency corresponding to m·100 kHz. A computational more efficient approach is based on the Fast Fourier Transformation, as outlined in the following. Not considered here is the uncertainty of a possible raster offset of ±7.5 kHz. As outlined below, this is covered by the robustness of the proposed method with regard to frequency offsets.

In a preferred embodiment, the present method comprises a first stage, at which an average part of a cyclic prefix of a baseband signal is removed. In the LTE standard a so-called cyclic prefix (CP) is used and prepended before each OFDM symbol in order to obtain a time window of orthogonal data transmission without inter-carrier and inter-symbol interference.

Let $\{x(k)\}$ be the discrete time baseband signal obtained at some sampling frequency $fs \geq BW+2M\Delta$. A first required processing part is to remove the average part of the cyclic prefix from the sequence of incoming data samples x(k). Assuming a typical LTE sampling rate $$f_s = \frac{1}{K} 30.72 \text{ MHz}$$

is used, where K is an integer value. For K=16, a sampling rate of 1920 kHz provides sufficient oversampling for $M \leq 8$. In this case, the average cyclic prefix can be removed by discarding Q(s=n mod 7) IQ samples, once the n-th chunk of 128 IQ samples has been captured, where $\{Q(s)\}_{s=0}^{6}=\{10, 9,9,9,9,9,9\}$. Alternatively, a slightly lower sampling rate $$f_s = \frac{14}{15K} 30.72 \text{ MHz}$$

can be used. In this case, the process of periodically discarding samples as described above can be avoided, since the lowering of the sample rate performs already the cyclic prefix removal.

In a further preferred embodiment, the method comprises a second stage, at which time domain vectors of N IQ samples are collected in time, such that an average time difference of the time domain vectors is equal to one LTE OFDM symbol, whereas N is the length of the vector. An OFDM symbol consists of 12 subcarrier occupying a bandwidth of 180 kHz. This second stage performs the average cyclic prefix removal.

In a further embodiment, the method comprises a third stage, at which a vector in the frequency domain of each time domain vector is computed, applying a Discrete Fourier Transformation (DFT), forming a DFT vector, respectively.

Without loss of generality, let K=16. Regardless of the method applied for average cyclic prefix removal, each LTE frame consists of 140 consecutive time domain OFDM symbol vectors xn of the form $x_n=[x(k+n\cdot 128), x(k+n\cdot 128+1), \ldots, x(k+n\cdot 128+127)]^T$ for n=0, 1, . . . , 139. By using a Discrete Fourier Transformation of length N=128 one can obtain a corresponding frequency domain vector $X=DFT_{128}(x_n)$. This is more efficient than applying a bank of local discrete time mixers in conjunction with a FFT.

In another preferred embodiment the third stage is based on a Fast Fourier Transformation (FFT). This is an even more efficient method to achieve the DFT result.

In a further preferred embodiment the method comprises a fourth stage, at which a Hadamard product of a current DFT vector with a conjugate of a previous DFT vector is computed.

This means, the Hadamard product can be expressed as $F_n=X_n \circ X_{n-1}^*$ (Eq. 3), whereas $X_n$ is the current DFT vector of the n-th OFDM symbol vector and $X_{n-1}$ is the conjugate of the previous DFT vector of the conjugate of the previous OFDM symbol vector in time. Due to the good auto-correlation properties of the Zadoff-Chu sequence, the magnitude |Fn| for the symbols n belonging to the NPSS is relative large, provided the sampling is aligned with regard to the boundary of an OFDM symbol.

Furthermore, it is a preferred embodiment that index points Wm of the Hadamard products are added with regard to a frequency content of the received NB-IoT signal of the m-th EARFCN. This provides raw estimates for all 2M+1 EARFCNs. This reduces memory requirements as explained below.

To improve the reliability of the NPSS signal detection the collection of Hadamard products with the added index points Wm are averaged over a time period of multiple LTE frames. The number of LTE frames for averaging can be used to trade-off between scan speed and sensitivity.

In another preferred embodiment, the method comprises a fifth stage, at which a cover code of NPSS contained in the NB-IoT NPSS signal is taken into consideration with regard to the Hadamard product in order to calculate output values. This further improves the reliability of the NPSS signal detection.

In a further preferred embodiment of the method the time domain vector is separated by one half of a LTE OFDM symbol in time, the frequency domain vectors are computed based on the half of the LTE OFDM symbols, the Hadamard product is performed with a corresponding alternate half of a LTE OFDM symbol in time, thus the average time difference of the Hadamard products is again one OFDM symbol period.

If $F_n=X_n \circ X_{n-1}^*$, as stated above is the Hadamard product of the n-th OFDM symbol vector with the conjugate of the previous OFDM symbol vector in time and due to the good auto-correlation properties of the Zadoff-Chu sequence, the magnitude |Fn| for the symbols n belonging to the NPSS is relative large, provided the sampling is aligned with regard to the boundary of an OFDM symbol. However, since the symbol boundary is unknown while performing a NPSS signal detection, the magnitude |Fn| strongly depends on the initial sampling point. This dependency can be relaxed by considering a set of time shifted vectors $x_n=[x(k+n\cdot 128+v_p)$, $x(k+n\cdot 128+v_p+1), \ldots, x(k+n\cdot 128+v_p+127)]^T$ for p=0,1,2,3 with vp=p·32 and computing corresponding values $X_n^p$ and $F_n^p$, respectively.

Figure 2:
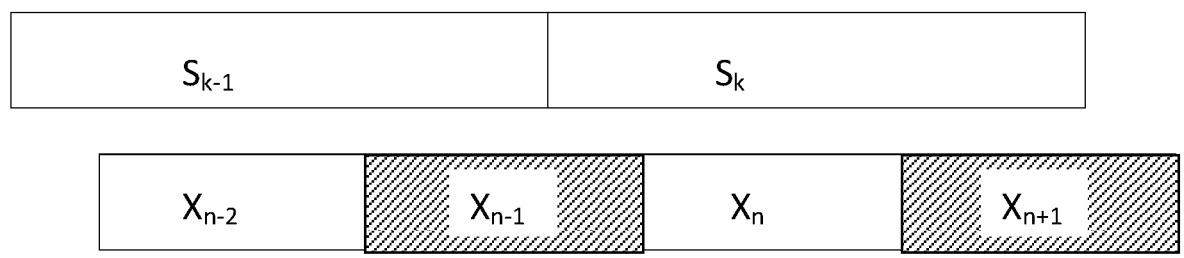

According to the previous preferred embodiment it is an even simpler approach to consider half symbols rather than complete OFDM symbols. Let $x_n=[x(k+n\cdot 64), x(k+n\cdot 64+1), \ldots, x(k+n\cdot 64+63)]^T$ be the n-th half symbol for n=0, 1, . . . , 279 belonging to a complete LTE frame. Assuming $X_n=DFT_{64}(x_n)$, similar to Eq. 3, and let $F_n=X_n\circ X_{n-2}^*$ (Eq. 4). In this case, the dependency of |Fn| with regard to the initial sampling point is considerably relaxed, since at least one portion of a half symbol is always contained in a complete OFDM symbol, regardless of the initial sampling point. This is shown in FIG. 2. The complete OFDM symbols Sk−1 and Sk at the radio interface obtain some offset with regard to the random symbol boundary of Xn. As can be seen, the half symbols of the pair (Xn−2, Xn) are contained within the adjacent OFDM symbols Sk−1 and Sk, whereas the half symbols of (Xn−1, Xn+1) are not.

Note that the k-th element Xn(k) of the vector Xn corresponds to an estimate of the frequency content $$\hat{X} = \left( e^{\left( j\frac{2\pi k}{64} \right)} \right)$$

of the baseband signal. In order to reduce the memory requirements, it is sufficient to store values $A_{n,m}=\Sigma_{k\in W_m}F_n(k)$, −M≤m≤M, n=0, 1, . . . , 279 where Wm is the set of frequency indices belonging to the main spectral part of the NB-IoT signal with regard to the m-th EARFCN.

To improve the reliability of the NPSS signal detection, An,m can be averaged over multiple LTE frames v=1, . . . , NF according to $B_{n,m}(v)=\alpha B_{n,m}(v-1)+\beta A_{n,m}(v)$ (Eq. 5) with $B_{n,m}(0)=0$ and 0≤α,β≤1.

The update of $B_{n,m}$ may be performed in real-time while receiving the I/Q samples. For the nx-th chunk of N samples, the computational complexity of updating $B_{n,m}$ is approximately given as follows: N log$_2$N applying the Fast Fourier Transform (FFT), N multiplications, (2M+1)|Wm| additions have to be performed. Hence, storage of $B_{n,m}$ is required for n=0, 1, . . . , 279 and −M≤m≤M, while performing an in-place update over several frame periods. Storage of Xn and Xn−2 is only locally required for step n=nx up to a depth of 3.

In a further preferred embodiment of the inventive method, 2M+1 peak values are computed with regard to calculated output values according to the cover code of NPSS contained in the NB-IoT NPSS signal and the Hadamard product according to the fifth stage. This has the advantage that the 2M+1 candidates can be examined in parallel.

In another preferred embodiment of the inventive method a single reference value is computed with regard to the output values of the fifth stage. This reference value in conjunction with the peak values provide a decision on the presence of a NB-IoT signal.

Furthermore, in a preferred embodiment of the inventive method a post processing is performed by re-scanning the peak values at a different center frequency, whereas a minimum peak value is taken from the initial scan at a first center frequency and a second scan at the different center frequency. The peak values which had been computed with regard to calculated output values according to the cover code of NPSS contained in the NB-IoT NPSS signal and the Hadamard product according to the fifth stage will be re-scanned a second time using a different center frequency. One obtains different peak values from the first scan and the second scan at the different center frequency, respectively. The minimum peak value is taken from these both scans, providing a more reliable estimate of the EARFCN.

According to Eq. 1, the NPSS uses a specific cover code. With regard to Eq. 5 let $C_{n,m}=|\Sigma_{l=0}^{9}S(l+1)S(l)B_{(2l+1) \mod 280,m}(v=N_F)|^2\geq 0$ (Eq. 6) and let $P_{peak}(m)=\max_{\{0\leq n\leq 279\}}C_{n,m}$ {−M≤m≤M}.

This means that for each channel value {−M≤m≤M} a dedicated peak value $P_{peak}(m)$ is computed. Let $P_{ref}$ be a common reference value according to $$P_{ref} = \frac{T}{280}\sum_{n=0}^{279} C_{n,m_{opt}}$$

with $m_{opt}$ taken from $(m_{opt}, n_{opt})=\arg\text{-max}_{\{-M\leq m\leq M, 0\leq n\leq 279\}} C_{n,m}$ and T being a scaling factor. The presence of a NPSS can be considered if $P_{peak}(m)\geq P_{ref}$ (Eq. 7). This reference value performs an automatic calibration with regard to the dynamic range of the baseband signal {x(k)}. The scaling factor T should be chosen such that the false alarm rate is very low. A conservative value for T with regard to a very low false alarm rate is found by $$\frac{P_{peak}(m)}{P_{ref}} \approx \frac{1}{4} \quad \{-M \leq m \leq M\}$$

the presence of a pure Gaussian noise random signal.

Note that the argument of the complex number Bn;m is proportional to the carrier frequency offset, see Eq. 4 making the estimation very robust with regard to an unknown carrier frequency offset. A channel raster offset and a possibly large frequency offset due to crystal tolerances of the user equipment (UE) (up to 25 ppm) are covered by the method of this invention.

The computation of Cn;m can be performed in an additional post-processing part, once the RF interface has already been turned off. Since all information of Cn;m can be obtained from Bn;m, explicit storage of Cn;m is not required in order to compute Ppeak(m) and Pref.

Figure 3:
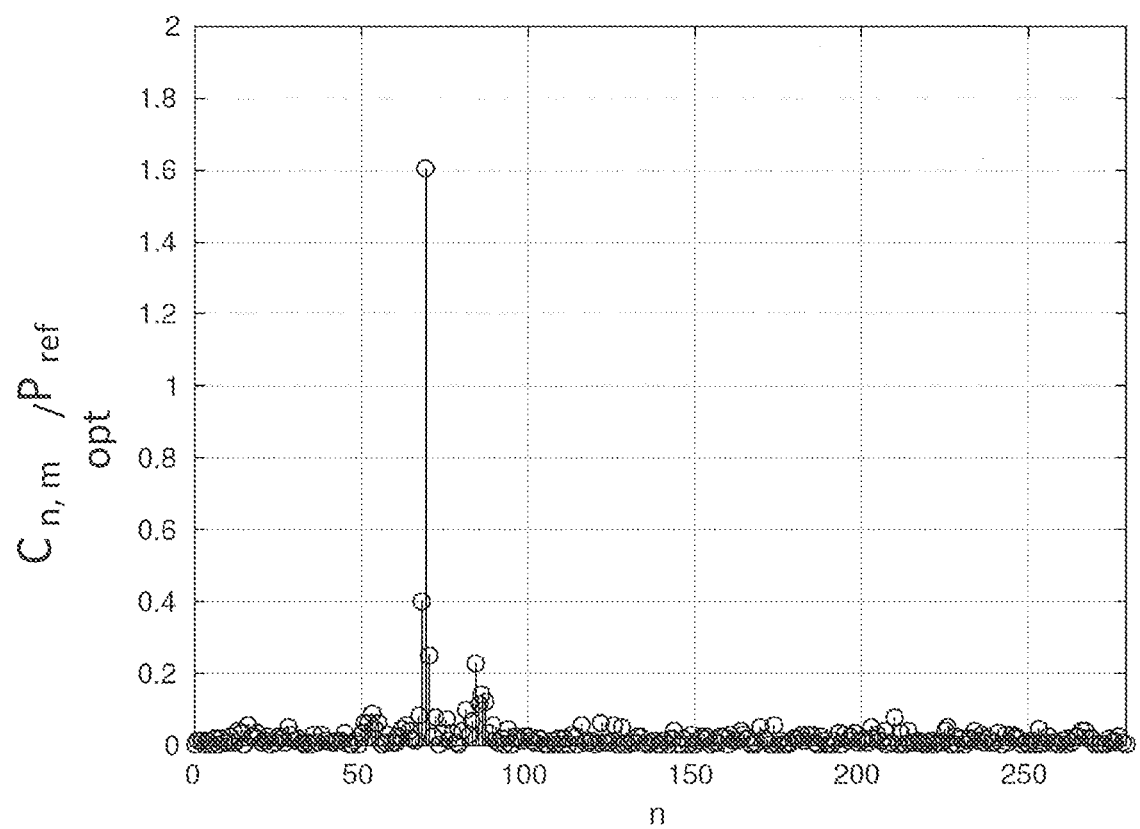

FIG. 3 shows a plot of a measurement result of an embodiment of the invention, applying NF=16 frames for averaging with parameters α=β=1. Scanning has been performed at fc=806 MHz, observing 11 channels (M=5). The RF interface operated at low input power (10 log 10 SNR<0) with 10 ppm offset from the reference clock.

Note that deliberately a set of 2M+1 peak values Ppeak (m) are computed, and not only Ppeak(m=mopt). This is outlined in the following. Depending on the properties of the radio part, the proposed algorithm may incorrectly indicate additional NB-IoT signals in the vicinity of the correctly detected EARFCN. This may be, for instance, caused due to I/Q mismatch of the receive path of a low IF receiver. In order to mitigate those unwanted false positive detections, it is useful to re-invoke the complete scan but using a different center frequency fc+fo. The frequency offset fo should be a multiple of 100 kHz and be chosen such that the found peaks can be re-measured using a single snapshot. Taking the minimum of the peak values with regard to the previous measurement, may retrieve the false peak candidates from the true candidate of the EARFCN.

BRIEF DESCRIPTION OF THE DRAWING FIGURES

The invention will be explained in more detail using exemplary embodiments.
The appended drawings show
FIG. 1 A scan of multiple NB-IoT signals simultaneously;
FIG. 2 Half symbol correlation in relation to complete OFDM symbols;
FIG. 3 Correlation result in the presence of a noisy NB-IoT signal at $m_{opt}$.

DETAILED DESCRIPTION

FIG. 1 shows a frequency interval $$-\frac{BW}{2} - M\Delta \le f \le M\Delta + \frac{BW}{2}, \Delta = 100 \text{ kHz}$$

which supports a simultaneous scan of EARFCN−M≤m≤−1 and 1≤m≤M in addition to the EARFCN for m=0 relative to the carrier frequency $f_c$.

Applying a higher sampling rate $f_s$ and thus observing the signal at a higher receive bandwidth relative to the signal bandwidth BW gives rise to a parallel search of multiple EARFCNs in a single run of NPSS search.

Let {x(k)} be the discrete time baseband signal obtained at some sampling frequency $f_s \ge BW+2M\Delta$. A first required processing part is to remove the average part of the cyclic prefix from the sequence of incoming data samples x(k). Assuming a typical LTE sampling rate $$f_s = \frac{1}{K} 30.72 \text{ MHz}$$

is used, where K is an integer value. For K=16, a sampling rate of 1920 kHz provides sufficient oversampling for M≤8. In this case, the average cyclic prefix can be removed by discarding Q(s=n mod 7) IQ samples, once the n-th chunk of 128 IQ samples has been captured, where $\{Q(s)\}_{s=0}^{6} = \{10, 9,9,9,9,9,9\}$. Alternatively, a slightly lower sampling rate f $$f_s = \frac{14}{15K} 30.72 \text{ MHz}$$

can be used. In this case, the process of periodically discarding samples as described above can be avoided, since the lowering of the sample rate performs already the cyclic prefix removal.

Without loss of generality, let K=16. Regardless of the method applied for average cyclic prefix removal, each LTE frame consists of 140 consecutive time domain OFDM symbol vectors $x_n$ of the form $x_n=[x(k+n \cdot 128), x(k+n \cdot 128+1), \ldots, x(k+n \cdot 128+127)]^T$ for n=0, 1, . . . , 139. By using a Discrete Fourier Transformation of length N=128 one can obtain a corresponding frequency domain vector $X_n=DFT_{128}(x_n)$, which is more efficient than applying a bank of local discrete time mixers. Let $F_n=X_n \circ X_{n-1}^*$ (Eq. 3) be the Hadamard product of the n-th OFDM symbol vector $X_n$ with the conjugate of the previous OFDM symbol vector $X_{n-1}^*$ in time. Due to the good auto-correlation properties of the Zadoff-Chu sequence, the magnitude $|F_n|$ for the symbols n belonging to the NPSS is relative large, provided the sampling is aligned with regard to the boundary of an OFDM symbol.

However, since the symbol boundary is unknown while performing a NPSS signal detection, the magnitude $|F_n|$ strongly depends on the initial sampling point. This dependency can be relaxed by considering a set of time shifted vectors $x_n^P=[x(k+n \cdot 128+v_p), x(k+n \cdot 128+v_p+1), \ldots, x(k+n \cdot 128+v_p+127)]^T$ for p=0,1,2,3 with $v_p=p \cdot 32$ and computing corresponding values XP and $F_n^P$, respectively.

Referring to FIG. 2. A simpler approach is to consider half symbols rather than complete OFDM symbols. Let $x_n=[x(k+n \cdot 64), x(k+n \cdot 64+1), \ldots, x(k+n \cdot 64+63)]^T$ be the n-th half symbol for n=0, 1, . . . , 279 belonging to a complete LTE frame. Let $X_n=DFT_{64}(x_n)$, and similar to Eq. 3, let $F_n$ be defined as $F_n=X_n \circ X_{n-2}^*$ (Eq. 4). In this case, the dependency of $|F_n|$ with regard to the initial sampling point is considerably relaxed, since at least one portion of a half symbol is always contained in a complete OFDM symbol, regardless of the initial sampling point. This is shown in FIG. 2. The complete OFDM symbols $S_{k-1}$ and $S_k$ at the radio interface obtain some offset with regard to the random symbol boundary of $X_n$. As can be seen, the half symbols of the pair $(X_{n-2}, X_n)$ are contained within the adjacent OFDM symbols $S_{k-1}$ and $S_k$, whereas the half symbols of $(X_{n-1}, X_{n+1})$ are not.

Note that the k-th element $X_n$ (k) of the vector $X_n$ corresponds to an estimate of the frequency content $$\hat{X} = \left( e^{\left( j \frac{2\pi \cdot k}{64} \right)} \right)$$

of the baseband signal. In order to reduce the memory requirements, it is sufficient to store values $A_{n,m}=\Sigma_{k \in W_m} F_n(k)$, −M≤m≤M, n=0, 1, . . . , 279 where $W_m$ is the set of frequency indices belonging to the main spectral part of the NB-IoT signal with regard to the m-th EARFCN.

To improve the reliability of the NPSS signal detection, $A_{n,m}$ can be averaged over multiple LTE frames v=1, . . . , $N_F$ according to $B_{n,m}(v)=\alpha B_{n,m}(v-1)+\beta A_{n,m}(v)$ (Eq. 5) with $B_{n,m}(0)=0$ and $0 \le \alpha, \beta \le 1$.

The update of $B_{n,m}$ may be performed in real-time while receiving the I/Q samples. For the $n_x$-th chunk of N samples, the computational complexity of updating $B_{n,m}$ is approximately given as follows: N $\log_2$N applying the Fast Fourier Transform (FFT), N multiplications, (2M+1)$|W_m|$ additions have to be performed. Hence, storage of $B_{n,m}$ is required for n=0, 1, . . . , 279 and −M≤m≤M, while performing an in-place update over several frame periods. Storage of $X_n$ and $X_{n-2}$ is only locally required for step n=$n_x$ up to a depth of 3.

According to Eq. 1, the NPSS uses a specific cover code. With regard to Eq. 5 let $C_{n,m}=|\Sigma_{l=0}^9 S(l+1)S(l) B_{(2l+1) mod\ 280,m}(v=N_F)|^2 \ge 0$ (Eq. 6) and let $P_{peak}(m) = \max_{\{0 \le n \le 279\}} C_{n,m}$ {−M≤m≤M}.

This means that for each channel value {−M≤m≤M} a dedicated peak value $P_{peak}(m)$ is computed. Let $P_{ref}$ be a common reference value according to $$P_{ref} = \frac{T}{280} \sum_{n=0}^{279} C_{n,m_{opt}}$$

with $m_{opt}$ taken from $(m_{opt}, n_{opt})$=arg-max$_{\{-M \leq m \leq M, 0 \leq n \leq 279\}}$ $C_{n,m}$ and T being a scaling factor. The presence of a NPSS can be considered if $P_{peak}$ (m)≥$P_{ref}$ (Eq. 7). This reference value performs an automatic calibration with regard to the dynamic range of the baseband signal {x(k)}. The scaling factor T should be chosen such that the false alarm rate is very low. A conservative value for T with regard to a very low false alarm rate is found by $$\frac{P_{peak}(m)}{P_{ref}} \approx \frac{1}{4} \quad \{-M \leq m \leq M\}$$

in the presence of a pure Gaussian noise random signal.

Note that the argument of the complex number $B_{n;m}$ is proportional to the carrier frequency offset, see Eq. 4 making the estimation very robust with regard to an unknown carrier frequency offset. A channel raster offset and a possibly large frequency offset due to crystal tolerances of the user equipment (UE) (up to 25 ppm) are covered by the method of this invention.

The computation of $C_{n;m}$ can be performed in an additional post-processing part, once the RF interface has already been turned off. Since all information of $C_{n;m}$ can be obtained from $B_{n;m}$, explicit storage of $C_{n;m}$ is not required in order to compute $P_{peak}$ (m) and $P_{ref}$.

FIG. 3 shows a plot of a measurement result of an embodiment of the invention, applying $N_F$=16 frames for averaging with parameters α=β=1. Scanning has been performed at $f_c$=806 MHz, observing 11 channels (M=5). The RF interface operated at low input power (10 log$_{10}$ SNR<0) with 10 ppm offset from the reference clock.

Note that deliberately a set of 2M+1 peak values $P_{peak}$(m) are computed, and not only $P_{peak}$ (m=$m_{opt}$). This is outlined in the following. Depending on the properties of the radio part, the proposed algorithm may incorrectly indicate additional NB-IoT signals in the vicinity of the correctly detected EARFCN. This may be, for instance, caused due to I/Q mismatch of the receive path of a low IF receiver. In order to mitigate those unwanted false positive detections, it is useful to re-invoke the complete scan but using a different center frequency $f_c+f_o$. The frequency offset $f_o$ should be a multiple of 100 kHz and be chosen such that the found peaks can be re-measured using a single snapshot. Taking the minimum of the peak values with regard to the previous measurement, may retrieve the false peak candidates from the true candidate of the EARFCN.

The invention claimed is:

1. A method for fast detection scan of Narrowband-Internet-of-Things (NB-IoT) signals in a single run of Narrowband Primary Synchronization Signal (NPSS) search performed by a user equipment (UE) by applying a higher sampling rate than 240 kHz and observing a received signal at a receive bandwidth relative to a NB-IoT signal bandwidth (BW) within a frequency interval −BW/2−MΔ≤f≤MΔ+BW/2, Δ=100 kHz to support a simultaneous scan of E-UTRA absolute radio frequency channel number (EARFCN)−M≤m≤−1 and 1≤m≤M in addition to the EARFCN for m=0 relative to a carrier frequency by the UE, whereas m is a EARFCN offset, wherein a set of 2M+1 NB-IoT signals each having a different EARFCN are observed simultaneously and M is a natural number and 2M+1 indicates a number of observed channels, and by using a wider bandwidth as well as a fast Fourier transformation to transform time domain samples into frequency domain samples and using special auto-correlations in the frequency domain to detect carrier frequency candidates which carry the NB-IoT signals simultaneously; wherein the method comprises a first stage, at which an average part of a cyclic prefix of a received baseband signal is removed; and a second stage, at which time domain vectors of N IQ samples of the received signal without the cyclic prefix are collected in time, whereas N is chosen such that an average time difference of the time domain vectors is equal to one Long Term Evolution Orthogonal Frequency Division Multiplexing (LTE OFDM) symbol, whereas N is the length of the vector.

2. The method for fast detection scan of NB-IoT signals according to claim 1, wherein the method comprises a third stage, at which a vector in the frequency domain of each time domain vector is computed, applying a Discrete Fourier Transform (DFT), forming a DFT vector, respectively.

3. The method for fast detection scan of NB-IoT signals according to claim 2, wherein the third stage is based on a Fast Fourier Transformation (FFT).

4. The method for fast detection scan of NB-IoT signals according to claim 2, wherein the time domain vector is separated by one half of a LTE OFDM symbol in time, frequency domain vectors are computed based on the half of the LTE OFDM symbols, a Hadamard product is performed with a corresponding alternate half of a LTE OFDM symbol in time, thus the average time difference of the Hadamard products is again one OFDM symbol period.

5. The method for fast detection scan of NB-IoT signals according to claim 2, wherein the method comprises a fourth stage, at which a Hadamard product of a current DFT vector with a conjugate of a previous DFT vector is computed.

6. The method for fast detection scan of NB-IoT signals according to claim 5, wherein index points $W_m$ of the Hadamard products are added with regard to a frequency content of the received NB-IoT signal of a m-th EARFCN.

7. The method for fast detection scan of NB-IoT signals according to claim 5, wherein the collection of Hadamard products are averaged over a time period of multiple LTE frames.

8. The method for fast detection scan of NB-IoT signals according to claim 5, wherein the method comprises a fifth stage, at which a cover code of NPSS contained in a NB-IoT NPSS signal is taken into consideration with regard to a Hadamard product in order to calculate output values.

9. The method for fast detection scan of NB-IoT signals according to claim 8, wherein 2M+1 peak values are computed with regard to calculated output values according to the cover code of NPSS contained in the NB-IoT NPSS signal and the Hadamard product.

10. The method for fast detection scan of NB-IoT signals according to claim 9, wherein a post processing is performed by re-scanning the peak values at a different center frequency, whereas a minimum peak value is taken from an initial scan at an initial center frequency and a second scan at the different center frequency.

11. The method for fast detection scan of NB-IoT signals according to claim 8, wherein a single reference value is computed with regard to the output values of the fifth stage.

\* \* \* \* \*